May 3, 1960

J. E. ECKEL ET AL 2,935,133

FORMATION TESTING

Filed Oct. 16, 1956

Jackson M. Kellner
John E. Eckel   Inventors

By *James A. Reilly* Attorney

May 3, 1960 J. E. ECKEL ET AL 2,935,133
FORMATION TESTING

Filed Oct. 16, 1956 3 Sheets-Sheet 2

Jackson M. Kellner
John E. Eckel   Inventors

By James A. Reilly   Attorney

May 3, 1960 J. E. ECKEL ET AL 2,935,133
FORMATION TESTING
Filed Oct. 16, 1956 3 Sheets-Sheet 3

Jackson M. Kellner
John E. Eckel   Inventors

By *James A. Reilly* Attorney

United States Patent Office 2,935,133
Patented May 3, 1960

2,935,133

FORMATION TESTING

John E. Eckel and Jackson M. Kellner, Tulsa, Okla., assignors, by mesne assignments, to Jersey Production Research Company Application October 16, 1956, Serial No. 616,194

1 Claim. (Cl. 166—188)

This invention relates broadly to well testing and more particularly to the testing of a subterranean formation for its hydrocarbon content. The invention especially concerns means for testing a possible oil-bearing formation by fracturing the formation and establishing a passageway to enable formation fluids to escape from the formation. The invention particularly relates to a combination fracturing and drill stem testing tool which fractures a subterranean formation and enables fluids to pass from within the formation and up the drill stem.

Well testing is a continuing problem in the petroleum producing industry and has as its general objective the detection of petroleum hydrocarbons in formations that are penetrated by a drilling operation. Generally speaking, well testing is carried out by periodically interrupting a drilling process and affording formation fluids an opportunity to escape from a formation into the well bore. Once within the well bore, the fluids are withdrawn to the surface of the earth and are subjected to conventional analytical procedures for detecting hydrocarbons.

The importance and the general principles of well testing techniques are well known, but no completely satisfactory well testing procedure has been developed to date. All too often, economically productive oil sands have been missed or their detection unduly delayed because of inaccurate or insufficient well test information. In some instances the deficiencies in the well testing procedures have been caused by the tools themselves; and in other instances they have resulted from well conditions which seriously impair the operation of the tools. For example, it has been observed that drilling mud, which is conventionally used in rotary drilling operations, may plug or "block" a formation and thereby prevent fluids including petroleum from escaping the formation and entering a well bore. Such plugging or blocking may be caused by liquid filtrate from the drilling mud which swells clay particles within the formation or reacts with salts in the formation to cause a precipitate that abstructs flow. Solid particles in the mud may also cause plugging.

In view of the deficiences that exist in the present formation testing apparatus and procedures, especially as occasioned by "blocking" of a formation by well fluids, it is an object of this invention to provide a well testing system which overcomes these deficiencies. It is a more particular object of the invention to provide an apparatus and procedure which effectively penetrates deeply within a formation surrounding a well bore so as to establish a fluid passageway enabling fluids to escape from the formation. It is further an object of the invention to provide means for testing formations which are susceptible to blocking in the vicinity of a well bore by establishing a passageway which extends from the well bore through the blocked portion of the formation and directly into the unblocked portion of the formation.

These and related objectives, which will be explicitly considered or readily apparent in the following description, are attained in accordance with this invention by establishing a fracture which extends from a well bore to a point relatively deep within a formation, thereby enabling fluids to flow from the formation into the well bore. Once within the well bore, the fluids may be withdrawn to the surface of the earth and subjected to conventional analytical testing procedures. In those instances where the formation tested is a commercially productive formation, a substantial production of oil into the well bore will be observed.

The invention may be better understood by reference to the attached drawing wherein a preferred embodiment and the best mode contemplated of carrying out the invention are illustrated.

Figures 1, 4:
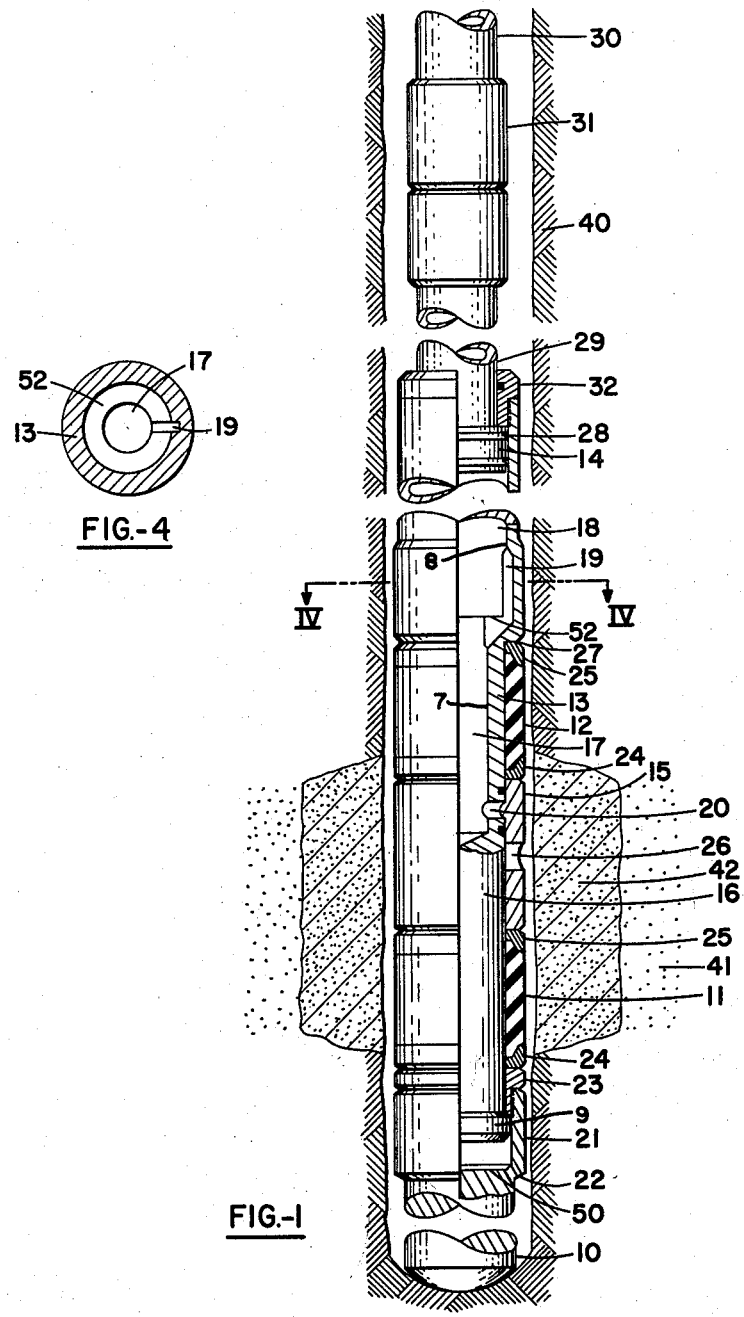
Figure 1 illustrates the apparatus as it is assembled and arranged when lowered into a sampling position within a well bore.
Figure 4 is a view in cross section of the tool in Figure 1 taken along the section lines IV—IV.

Turning first to Figure 1, it will be seen that the apparatus in this figure includes a tail pipe 10, straddle packers 11 and 12, mandrel 13, piston 14, and sleeve 15.

Mandrel 13 is essentially an elongated cylindrical member which is divided along its length into three sections. The lowermost section 16 is a rod-like portion which may be solid or hollow; the intermediate section 7 defines a chamber 17 adapted to hold a fracturing fluid; and the uppermost section 8 defines a chamber 18 which is adapted to hold a fracture fluid. The upper chamber 18 has a somewhat larger internal diameter than the lower chamber 17, and the wall portion at the junction between these two chambers is provided with a vertical fluid passageway in the form of a groove 19. The nature of this groove is more readily apparent from the illustration in Figure 4. It will be apparent, of course, that chambers 18 and 17 form essentially one continuous chamber; but for the purposes of this description, it is more convenient to consider them as separate entities.

A fluid passageway or port 20 is provided within the wall of chamber 17, preferably at a point immediately above the rod section 16.

The lower end of the rod section 16 terminates within a cylindrical hollow extension 21 of the tail pipe 10. A fluid passageway or port 22 is provided at the lower end of the cylindrical extension 21 to enable fluids to drain from this portion of the tail pipe into the bore hole. Threaded into the upper end of extension 21 is a bushing 23 upon which a lower end of straddle packer 11 rests. Bushing 23 also cooperates with the enlarged end portion 9 of the rod 16 to prevent the rod from being disengaged from the tail pipe 10.

Straddle packer 11 as well as straddle packer 12, it will be noted, are depicted to be elastic sleeve type packers tightly sealed at each end within metal rings 24 and 25. Both packers are adapted to slide longitudinally relative to the mandrel. Furthermore, the packers are vertically spaced or separated by means of sleeve 15 which also surrounds mandrel 13 and is longitudinally movable relative to the mandrel.

Sleeve 15 is provided with a fluid passageway or port 26 which is in vertical alignment with a port 20 in mandrel 13. To insure vertical alignment of the two ports, a keyway, spline or equivalent means may be employed to interconnect sleeve 15 and the mandrel. For the sake of simplicity, such a device has not been included in the drawing; but its nature and function will be readily apparent to persons skilled in the art.

The upper end of straddle packer 12 abuts against a shoulder 27 which is formed on the outer wall surface of the mandrel 13. The shoulder limits vertically upward movement of the packer relative to the mandrel.

Piston 14 is adapted to fit within and move longitudinally relative to the upper chamber 18 of mandrel 13. Piston rings 28 or equivalent devices are disposed between the piston and the inner wall of section 18 in order to provide a slidable but fluid-tight relationship therebetween. Hollow piston rod 29 is secured to piston 14, extends vertically beyond upper section 18, and is connected to the drill stem or equivalent well pipe 30 as by means of conventional coupling device 31. A bushing 32 is threaded or otherwise secured within the upper end of chamber 18 to prevent piston 14 from moving vertically out of the mandrel.

Having thus briefly enumerated and described the structural nature of the apparatus in Figure 1, attention is now directed toward a consideration of the manner in which this apparatus operates. In connection with this phase of the discussion, it will be assumed that the apparatus has been lowered within a bore hole 40, and that it is to be employed to sample a formation 41 surrounding the bore hole. It will further be assumed that formation 41 is of a type which is susceptible to blocking by the presence of drilling mud and that a mud-blocked zone 42 actually exists immediately adjacent the well bore. It will additionally be assumed that formation 41 exists relatively near the bottom of the bore hole 40 so that a tail pipe 10 may be used to space the tool within the hole. It will be recognized, of course, that a number of devices such as hook wall packers and grippers have already been suggested in the art and are readily adapted to the illustrated apparatus in order to render this apparatus more suitable for testing formations that lie well above the bottom of a well bore. It will additionally be assumed that lower chamber 17 and upper chamber 18 are filled with a fracturing fluid. Fracturing fluid suitable for use in the practice of this invention include crude and refined petroleum and fractions thereof, preferably narrow-cut for ease of identification. Gelling agents, supporting agents, thickening agents, chemical tracers, and the like may also be used as desired. Synthetic liquid polymers compatible with fracturing operations may likewise be employed.

When the tool of Figure 1 has been lowered such that tail pipe 10 rests on the bottom of the bore hole, the following sequence of steps takes place. First, further lowering of the pipe 30 causes piston 14 to be thrust downwardly within chamber 18. Since the fluid within this chamber, however, is substantially non-compressible, it follows that mandrel 13 receives a vertical downward thrust along with the piston. Inasmuch as the tail pipe 10 rests solidly against the bore hole bottom, both piston 14 and mandrel 13 move vertically downward relative to the tail pipe. Any fluid trapped within extension 21 is free to escape therefrom through the port 22 during this phase of the operation.

Figure 2:
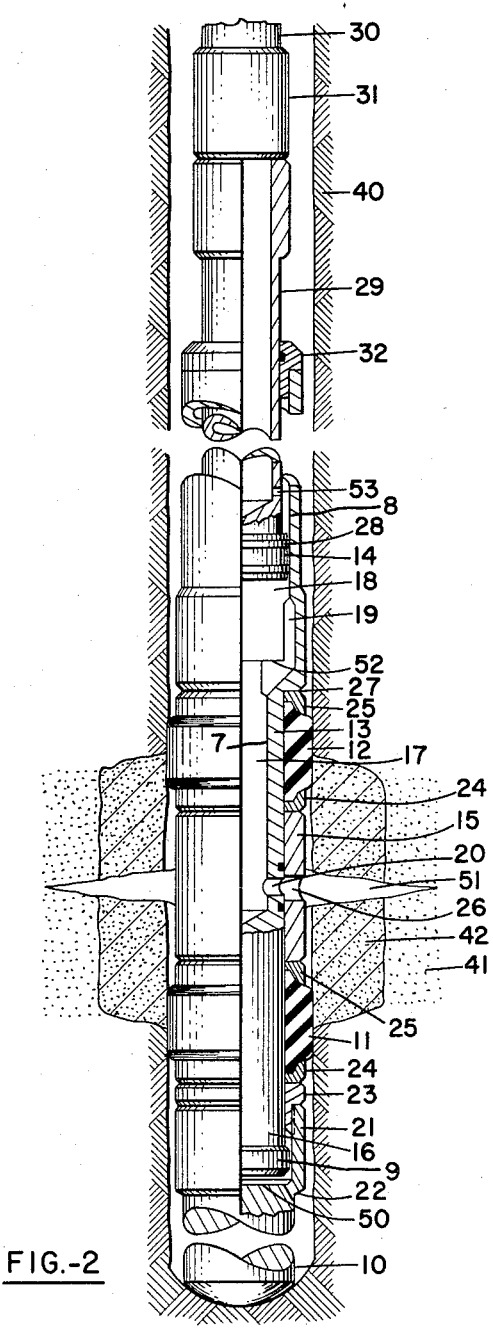
Figure 2 illustrates the apparatus of Figure 1 as it appears when the apparatus is in the process of fracturing a formation.

As mandrel 13 moves downward relative to tail pipe 10, shoulder 27 thrusts against the upper ring 25 of packer 12; and bushing 23 similarly exerts an upward thrust against the lower ring 24 of packer 11. The result of these two thrusts is to cause packers 11 and 12 to be set against the wall of the bore hole as illustrated in Figure 2. Compression of the packers continues until port 20 becomes laterally or horizontally aligned with port 26. Alignment of the ports after seating of the packers may be insured by conventional design procedures. For example, the lower end of rod extension 16 may be caused to strike or rest against the bottom 50 of cylindrical extension 21 at the moment that the ports become aligned.

When the packers are set and the ports are in alignment, piston 14 is free to move downward within mandrel 13 in response to the weight of the drill stem 30. Unseating of the packers during this phase of the operation is prevented in substantially all instances by the magnitude of the fluid pressure which is generated within the mandrel by the movement of the piston. It will be apparent, however, that unseating of the packers may be insured against by constructing the mandrel 13 of adequate size and weight to continuously compress the packers. Alternatively, gripping elements may be provided in the side wall of the mandrel and adapted to engage the wall of the bore hole upon downward movement of the piston relative to the mandrel. Such expedients as these will be readily apparent and understood by persons skilled in the art.

Figure 3:
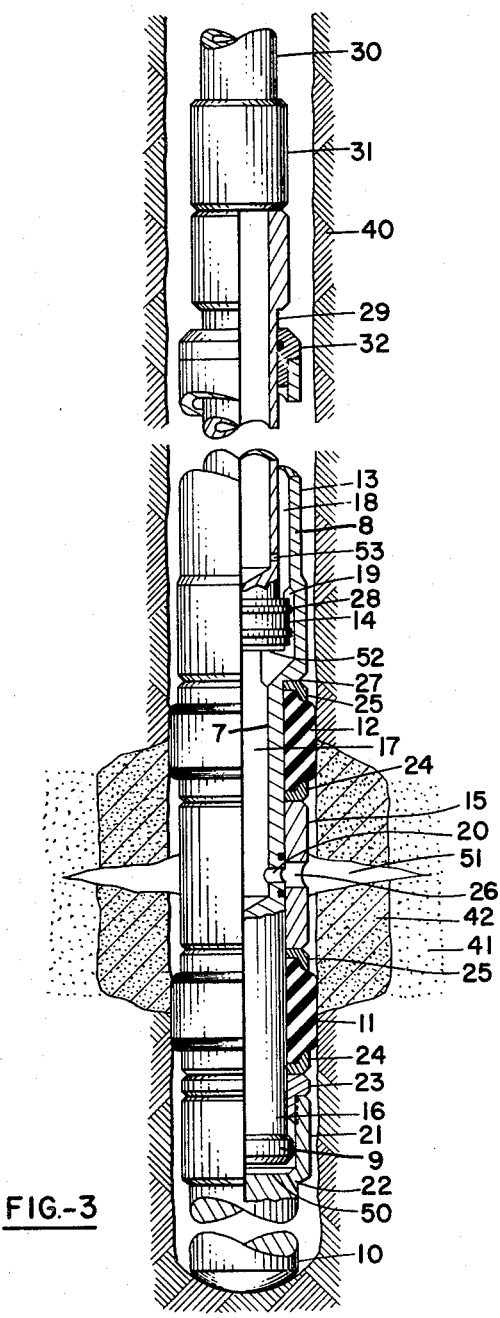
Figure 3 illustrates the apparatus of Figures 1 and 2 during the operational phase in which fluid flows from the fractured formation into the drill stem.

As mentioned above, downward movement of piston 14 causes fracturing fluid to flow through the ports 20 and 26 and to enter the annulus between sleeve 15 and the wall of the bore hole. Vertical movement of the fluid within the annulus is restricted by virtue of the packers 11 and 12; and upon the exertion of a sufficient thrust of the piston, fracturing of formation 41 occurs. The nature and disposition of a typical fracture is illustrated in Figures 2 and 3 by the legend 51. As will be apparent there, the fracture may be readily extended to a point laterally beyond the blocked region 42. The extent of the fracture enables fluid to flow from the unblocked portion of the formation 41 directly into the bore hole annulus and thence through ports 26 and 20 within chamber 17.

It will be apparent at this point that chamber 17 must be vented following generation of the fracture 51 in order that formation fluid may flow into the chamber. Such venting is attained by driving piston 14 vertically downward until it rests on the shoulder 52. It will be recognized that piston 14 upon engaging shoulder 52 is by-passed by the slot or groove 19. Pressure within the chamber 17 is thus released, and fluid is free to flow from the chamber through the slot 19 and thence up the drill stem. Release of the pressure within the chamber may be prevented or delayed as desired by maintaining piston 14 vertically above slot 19 as long as necessary. Passageway or port 53 in the sidewall of hollow piston rod 29 enables fluid which has passed through slot 19 to enter within the piston rod and thence the drill stem. If proper surface connections to the drill stem are provided fluid may be allowed to flow from the formation to the surface. Or, if desired, the port 20 may be left open long enough for a representative sample to enter the drill stem.

When it is desired to retract the tool illustrated in the drawing, a reverse sequence of operations is involved. Thus, the drill stem 30 is lifted with the result that piston 14 is withdrawn upwardly until it engages the lower end of bushing 32. Mandrel 13 is moved vertically upward relative to tail pipe 10, packers 11 and 12 are unseated, and ports 20 and 26 are moved out of alignment. The tool is therefore then in condition to be withdrawn from the bore hole with fluid trapped within chambers 17 and 18. Additional fluid, of course, may also be contained within the drill stem 30.

When the apparatus has been withdrawn from the bore hole 40, the tool may be dismantled, the fluid sample recovered and analyzed as desired. For example, the fluid may be distilled, chemically treated subjected to spectrographic examination, or the like as desired.

While the apparatus illustrated in the drawing and described above constitutes a preferred embodiment of the invention, it will be appreciated that a number of variations and modifications may be employed without departing from the spirit or scope of this invention. For example, it is contemplated that frangible discs may be inserted in the ports 20 or 26 in order that adequate fracturing fluid pressures may be developed before the fluid leaves the tool and penetrates a formation. It will also be appreciated as noted earlier that a wide variety of fracturing fluids may be employed; but preferred fluids are those that will not interfere unduly with analyses that are to be performed on a sample obtained from a formation. The fracturing fluid for the purpose should have a very low filtrate loss as determined by standard filter loss tests. A low filtrate loss serves to reduce the volume of fracturing fluid required to obtain the desired fracture depth and also insures against further filtrate loss in the uncontaminated formation penetrated by the test fractures.

It will also be recognized at this point that, while sleeve type packers are preferred for the purposes of this invention, other packers such as inflatable or balloon packers may also be utilized as desired. Again, a plurality of ports such as 20 and 26 may be used in place of the single ports which are illustrated in the drawing.

While the apparatus described above is especially adapted for formation testing, it will be recognized that it also has utility in selectively fracturing thin sand layers which may be interposed between shale banks. The packers 11 and 12 may be closely spaced for such applications, thereby enabling considerable fracturing to be realized with comparatively small volumes of fracturing fluids.

If the length of the chambers 17 and 18 is limited to the length of a tool that can be picked up in presently conventional derricks, it is contemplated that the chambers will have an overall length of about 100 feet. Such a length would provide somewhat limited fracturing fluid capacity, but the effective length of the chamber may be readily increased by adding additional sections to the chamber as the tool is started within the hole. In this manner several hundred or several thousand gallons of fracturing fluid can be readily provided as desired.

To summarize briefly, this invention then relates generally to a formation tester which is attachable to the lower end of a string of pipe and which utilizes in combination a cylinder or mandrel adapted to contain a fracturing fluid, straddle packers supported on the outer surface of the cylinder, and a piston fitted within the cylinder and adapted to apply pressure to the fracturing fluid. The apparatus further includes a normally closed port in the wall of the cylinder vertically intermediate the straddle packers, means for opening this port upon setting of the straddle packers, and means for rigidly positioning the cylinder. Downward movement of the piston thereby drives the fracturing fluid from the cylinder through the port and thence into a surrounding formation at a pressure and in a volume sufficient to fracture the formation. The apparatus further includes means for establishing direct fluid communication from the formation through the aforesaid port and thence through the cylinder and into the drill string when the piston has completed its compression stroke. Thus, the invention essentially comprises an apparatus and a method for testing a formation from a well bore by first fracturing the formation and thereafter enabling formation fluids to flow through the fracture and thence through a conduit which ultimately leads upward within the well bore.

What is claimed is:

A formation tester for use within a well bore which comprises in combination an elongated hollow piston rod attachable at its upper end and communicating with the lower end of a string of well pipe, a piston attached to the lower end of said piston rod, a cylindrical member of a character to contain a fluid and adapted at its upper end to receive said piston in a slidable relation, sealing means to effect a fluid-tight seal between the upper end of said cylindrical member and said piston rod, longitudinally spaced first and second sleeve packers mounted around said cylindrical member and in longitudinally slidable relation therewith, supporting means to support the lower of said packers at a preselected position within a well bore and to limit the degree of movement between said packers and said cylindrical member, a sleeve member mounted in a slidable fluid-tight relation around said cylindrical member between and abutting against said packers, a shoulder on the exterior of said cylindrical member abutting downward against said upper packer whereby downward movement of said cylindrical member relative to said supporting means will compress and set said packers against the wall of the well bore, longitudinally aligned ports in the side wall of said cylindrical member and in the side wall of said sleeve member, said ports arranged to be longitudinally displaced from one another except when said cylindrical member has moved downward relative to said supporting means a distance sufficient to set said packers, means associated with said cylindrical member to limit downward movement of said piston relative thereto to a point above said ports but sufficient to drive fluid from within said cylindrical member through said ports, a passageway in the wall of said cylindrical member arranged to bypass said piston when the piston is at the limit of its downward movement within said cylindrical member, and a port in the wall of said piston rod below said sealing means.

References Cited in the file of this patent
UNITED STATES PATENTS

| | | |
|---|---|---|
| 1,910,442 | Manning | May 23, 1933 |
| 2,365,327 | Barnes | Dec. 19, 1944 |
| 2,618,340 | Lynd | Nov. 18, 1952 |
| 2,637,400 | Brown et al. | May 5, 1953 |
| 2,699,212 | Dismukes | Jan. 11, 1955 |
| 2,715,444 | Fewel | Aug. 16, 1955 |
| 2,753,940 | Bonner | July 10, 1956 |
| 2,776,014 | Lee et al. | Jan. 1, 1957 |